US008636328B2

(12) United States Patent
Ye

(10) Patent No.: US 8,636,328 B2
(45) Date of Patent: Jan. 28, 2014

(54) RETENTION DEVICE FOR DATA STORAGE MODULE

(75) Inventor: Zhen-Xing Ye, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

(*) Notice: Subject to any disclaimer, the term of this patent is extended or adjusted under 35 U.S.C. 154(b) by 350 days.

(21) Appl. No.: 13/211,321

(22) Filed: Aug. 17, 2011

(65) Prior Publication Data
US 2012/0267501 A1 Oct. 25, 2012

(30) Foreign Application Priority Data

Apr. 25, 2011 (CN) .......................... 2011 1 0103512

(51) Int. Cl.
A47B 46/00 (2006.01)
A47B 49/00 (2006.01)
A47B 97/00 (2006.01)

(52) U.S. Cl.
USPC ....... 312/249.1; 312/333; 312/394; 248/27.3; 248/231.41; 248/309.1; 248/309.2; 248/310; 361/679.39; 361/679.43; 361/679.58

(58) Field of Classification Search
USPC .......... 248/27.1, 27.3, 231.81, 231.9, 231.91, 248/231.51, 231.41, 308, 309.1, 316.5, 248/312.1, 311.2, 309.2, 310; 296/70; 361/679.43; 312/333, 328, 334.13, 312/249.1, 294, 319.1, 319.2
See application file for complete search history.

(56) References Cited

U.S. PATENT DOCUMENTS

| 5,510,955 | A | * | 4/1996 | Taesang | 361/679.31 |
| 5,682,291 | A | * | 10/1997 | Jeffries et al. | 361/679.58 |
| 6,373,695 | B1 | * | 4/2002 | Cheng | 361/679.39 |
| 6,853,549 | B2 | * | 2/2005 | Xu | 361/679.39 |

* cited by examiner

Primary Examiner — Chi Q Nguyen
(74) Attorney, Agent, or Firm — Altis Law Group, Inc.

(57) ABSTRACT

A retention device includes a first holder and a second holder. Two locking members downwardly extend from front and rear ends of the first holder. Each of the locking members and the first holder defines a guideway. An engaging portion extends from a side of the first holder. The second holder includes a handle to lock the engaging portion of the first holder. A number of latch portions extend from two ends of the second holder. The second holder can be arranged under the first holder via the latch portions of the second holder received in the guideway of the first holder, or the second holder can be juxtaposed with the first holder via the handle of the second holder locking the engaging portion of first holder.

13 Claims, 5 Drawing Sheets

RETENTION DEVICE FOR DATA STORAGE MODULE

BACKGROUND

1. Technical Field

The present disclosure relates to retention devices and, more particularly, to a retention device for a data storage module.

2. Description of Related Art

An electronic apparatus, such as a desktop computer, tower computer, or server, usually includes storage modules, such as hard disk drives, compact disk read-only memory (CD-ROM) drives, and digital video disc (DVD) drives. These devices can be added to increase the functionality of the electronic apparatus as desired by a user.

A retention device is generally used to install a hard disk drive in a computer. However, the retention device is generally fixed, so when the configuration of the electronic apparatus is changed, the retention device also needs to be replaced. And to replace the whole retention device is costly.

Therefore, what is needed is a retention device, which can overcome the above described shortcomings.

SUMMARY OF THE INVENTION

In an exemplary embodiment, a retention device includes a first holder and a second holder. Two locking members downwardly extend from front and rear ends of the first holder. Each of the locking members and the first holder define a guideway. An engaging portion extends from a side of the first holder. The first holder includes a bottom wall. Each of the locking members includes a first portion perpendicularly and downwardly extending from a periphery of the bottom wall, and a second portion horizontally extending from a periphery of the first portion. The second holder includes a handle to lock the engaging portion of the first holder. A number of latch portions extend from two ends of the second holder. The second holder is arranged under the first holder via the latch portions of the second holder being received in the guideway of the first holder; or the second holder is juxtaposed with the first holder via the handle of the second holder locking the engaging portion of first holder.

When assembling the retention device, the first holder can be stacked or juxtaposed with the second holder; therefore, the retention device can be adjusted according to the different configurations, so the retention device is user-friendly.

DETAILED DESCRIPTION

Figure 1:
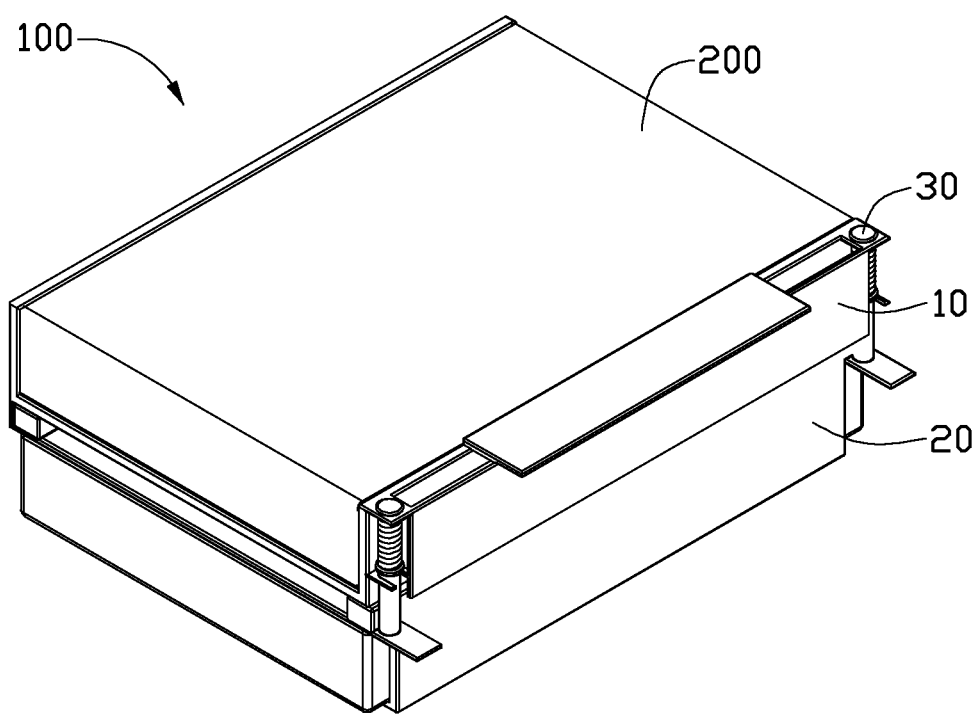
FIG. 1 is an isometric view of an exemplary embodiment of a retention device, in accordance with an exemplary embodiment of the present disclosure.
Figure 2:
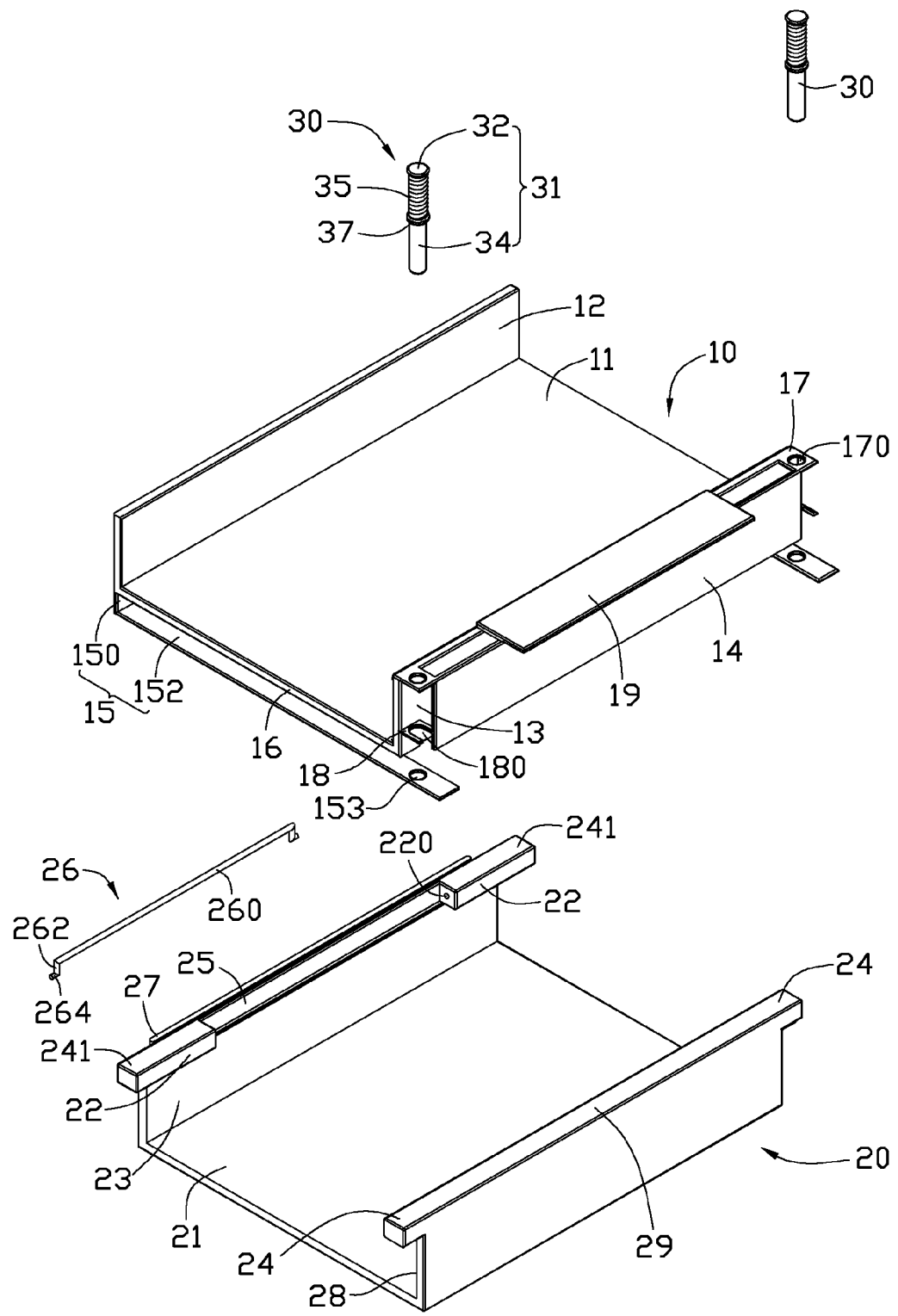
FIG. 2 is a partly disassembled view of FIG. 1.

Referring to FIGS. 1 to 2, an exemplary embodiment of a retention device 100 includes a first holder 10, a second holder 20 and two fasteners 30. The first and second holders 10, 20 can be mounted in an electrical device (not shown), such as a server or a computer. Each of the first and second holders 10, 20 is used to receive a storage module 200 therein.

The first holder 10 includes an elongated bottom wall 11, and two sidewalls 12, 13 respectively extending upwards from opposite sides of the bottom wall 11. Two L-shaped locking members 15 respectively extend from a front end and a rear end of a junction of sidewall 12 and bottom wall 11. Each locking member 15 includes a first potion 150 perpendicularly extending downwards from the corresponding end of the junction of sidewall 12 and bottom wall 11, and a second portion 152 horizontally extending from a bottom end of the first potion 150. In the present embodiment, the second portion 152 is parallel to and spaced from a bottom surface of the bottom wall 11. The second portion 152 and the bottom surface of the bottom wall 11 cooperatively define a guideway 16. A length of the second portion 152 exceeds a width of the bottom wall 11, and a free end of the second portion 152 extends beyond the sidewall 13 and defines a snapping hole 153 at a free end.

A bent plate 17 perpendicularly extends outwards from a top side of the sidewall 13 and respectively defines two fixing holes 170 at two opposite ends thereof. The fixing holes 170 are aligned with the snapping holes 153 of the locking members 15, respectively. A blocking portion 14 perpendicularly extends downwards from a periphery of the bent plate 17. The blocking portion 14 is parallel to and spaced from the sidewall 13. Two tongues 18 perpendicularly extend outwards from an outer surface of the sidewall 13 towards the blocking portion 14. The tongues 18 are mounted on two opposite ends of the sidewall 13, respectively. Each of the tongues 18 defines a U-shaped slot 180 therein. The slots 180 are in alignment with the snapping holes 153 of the locking members 15 and the fixing holes 170 of the bent plate 17. An engaging portion 19 is arranged on a middle upper surface of the bent plate 17. A width of the engaging portion 19 is greater than that of the bent plate 17.

Figure 5:
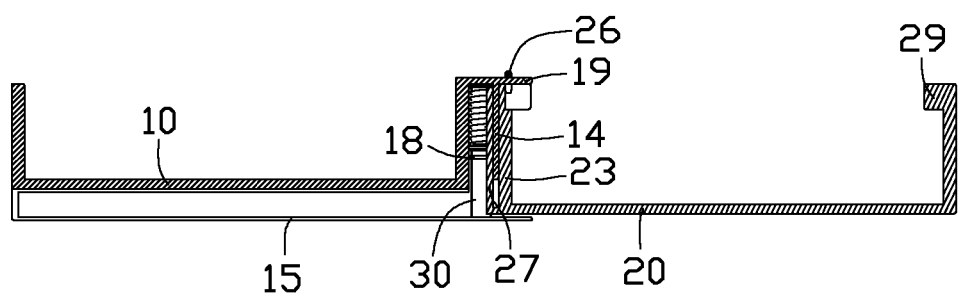
FIG. 5 is a cross-sectional view of the retention device taken along a line V-V of FIG. 4.

The second holder 20 includes an elongated bottom plate 21 and two side plates 23, 28 respectively extending upwards from opposite peripheral sides of the bottom plate 21. The second holder 20 is used to receive a storage module. An L-shaped clasping portion 27 (as shown in FIG. 5) extends from a bottom of the side plate 23. An elongated rectangular-shaped projection 29 perpendicularly extends inwards from the free end of the side plate 28. The projection 29 is longer than the side plate 28. Two first latch portions 24 are respectively formed at two opposite ends of the projection 29 beyond the side plate 28. In the present embodiment, the first latch portions 24 are integrally formed with the projection 29. Two elongated rectangle projections 22 are formed at opposite ends of a top of the side plate 23, respectively, and a rectangle notch 25 is defined in the top of the side plate 23 between the two rectangular-shaped projections 22. The notch 25 corresponds to the blocking portion 14, and the blocking portion 14 can extend through the notch 25. Each of the projections 22 defines a pivot hole 220 at a free end thereof. The two pivot hole 220 of the side plate 23 faces each other and are adjacent to the notch 25. Two second latch portions 241 extend at an end of each of the projections 22, and extend beyond the side plate 23. In the present embodiment, the second latch portions 241 are integrally formed with the projections 22, respectively.

The pivot holes 220 of the projections 22 is for receiving a handle 26. The handle 26 includes an elongated linear-shaped operating portion 260, two arms 262 perpendicularly extending from opposite ends of the operating portion 260 along a same direction, and two pivots 264 respectively extending outwardly from distal ends of the two arms 262 along opposite directions. The two pivots 264 are collinear and parallel to the operating portion 260. The two pivots 264 extend in the two pivot holes 220, for pivotably engaging the projections 22 on the side plate 23.

Each of the fasteners 30 includes a stud 31 and a spring 35. The stud 31 includes a disk-shaped head 32 and a rod 34 extending from the head 32. A cap 37 is coiled around a middle portion of an external surface of the rod 34. The spring 35 is coiled around the rod 34 and sandwiched between the head 32 and the cap 37. The rod 34 can extend through the fixing hole 170 of the bent plate 17, the slot 180 and the snapping hole 130 of the locking member 15. The spring 35 is installed between the tongue 18 and the bent plate 17.

In assembly, the projections 22 of the second holder 20 are sandwiched between the guideways 16 of the first holder 10 and slid inwards until engage with the first portions 150 of the locking member 15. In such a state, the second latch portions 24 of the projection 29 are located on the second portions 152 and under the sidewall 13. In the present embodiment, the spring 35 is arranged between the bent plate 17 and the tongue 18, a free end of the rod 34 extends through the fixing hole 170 and the spring 35, then the cap 37 coiled around the rod 34, and at last the free end of the rod 34 extends through the slot 180 and the snapping hole 153. Therefore, fixing the second holder 20 under the first holder 10, the head 32 abuts against the bent plate 17 at a periphery of the fixing hole 170, and the tongue 18 abuts against the cap 37, and the spring 35 is installed between the tongue 18 and the bent plate 17. Referring to FIG. 1 also, an assembled view of the retention device 100 with a first state, the first holder 10 is stacked with the second holder 20.

Figure 3:
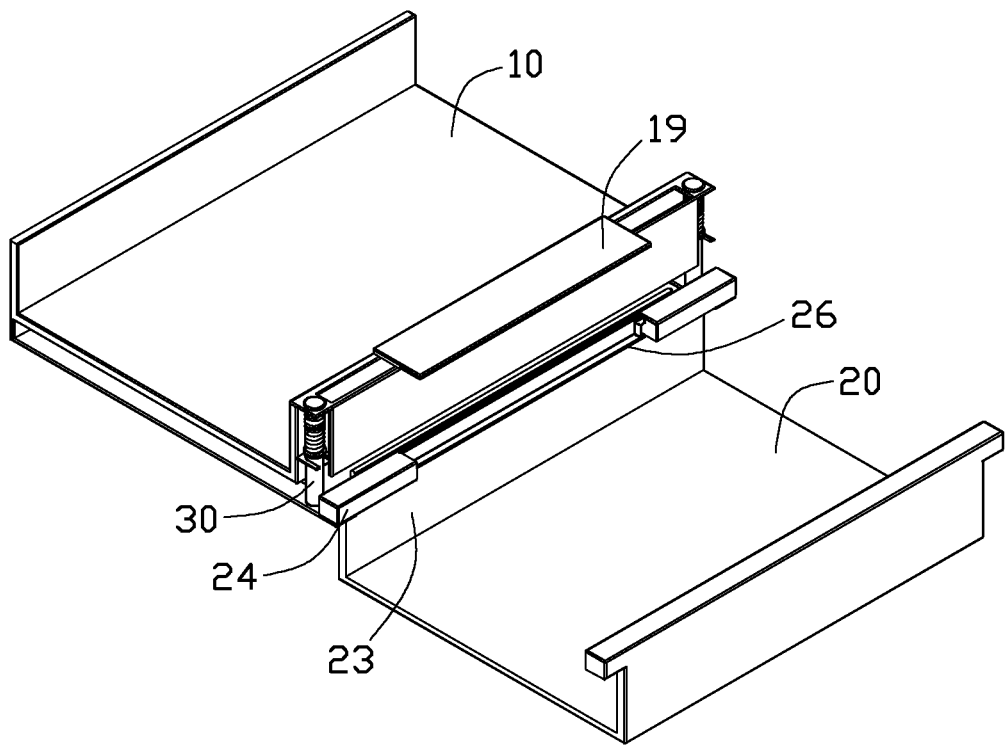
FIG. 3 is a partially assembled view of the retention device of FIG. 1.
Figure 4:
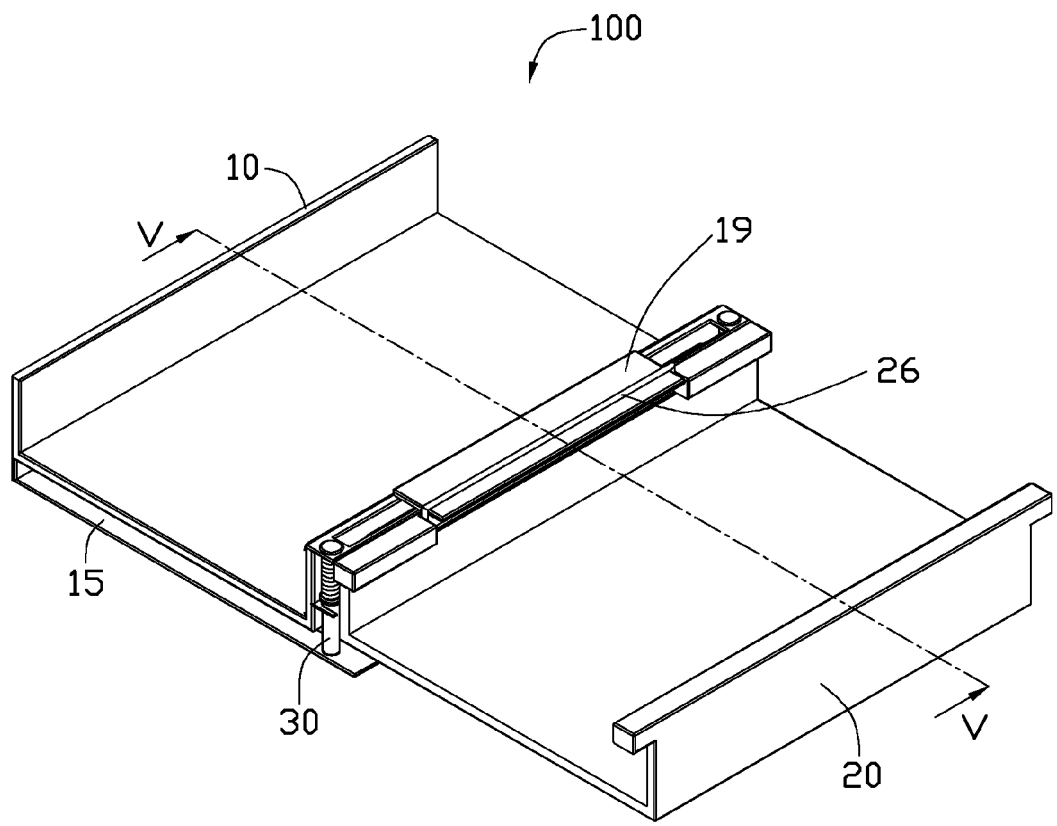
FIG. 4 is an assembled view of the retention device of FIG. 1, but in a different stage.

Referring to FIGS. 3 to 5, an assembly view of the retention device 100 at a second state is shown: the second holder 20 is juxtaposed with the first holder 10 with the side plate 23 and the clasping portion 27 of the second holder 20 sandwiching the blocking portion 14 of the first holder 10, while the engaging portion 19 is located on the clasping portion 27 and between the projections 22. The handle 26 is pivotably engaged with the projections 22, and the operating portion 260 of the handle 26 locks the engaging portion 19 of the first holder 10. Each of the fasteners 30 extends through the fixing hole 170 of the bent plate 170, the slot 180 of the tongue 18, and finally engaged in the snapping hole 153 of the second portion 152; therefore, the second holder 20 is fixedly engaged to and juxtaposed with the first holder 10.

When the retention device 100 is changed from the first state to the second state, the fasteners 30 is pulled upwards to depart from the snapping hole 153. Referring to FIG. 3 again, the second holder 20 is slid along the guideways 16 until the first latch portion 24 are beyond the locking member 15, and the second latch portions 241 are arranged on the free end of the locking member 15. The fasteners 30 are set down and extended to the snapping hole 153. The second holder 20 is pulled upwards, therefore, the side plate 23 and the clasping portion 27 can sandwich the blocking portion 14.

As described above, when assembling the retention device 100, the first holder 10 can be stacked or juxtaposed with the second holder 20; therefore, the retention device 100 can be adjusted according to the different configurations, so the retention device 100 is user-friendly.

It is to be understood, however, that even though numerous characteristics and advantages of various embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A retention device, comprising:
   a first holder, two locking members downwardly extending from front and rear ends of the first holder, each of the locking members and the first holder defining a guideway, an engaging portion extending from a side of the first holder, the first holder comprising a bottom wall, each of the locking members comprising a first portion perpendicularly and downwardly extending from a periphery of the bottom wall, and a second portion horizontally extending from a periphery of the first portion; and
   a second holder, the second holder comprising a handle to lock the engaging portion of the first holder, a plurality of latch portions extending from two ends of the second holder;
   wherein the second holder is arranged under the first holder via the latch portions of the second holder being received in the guideway of the first holder; or the second holder is juxtaposed with the first holder via the handle of the second holder locking the engaging portion of first holder.

2. The retention device of claim 1, wherein the first holder further comprises a sidewall extending upwards from a peripheral side of the bottom wall, the second portion extending beyond the sidewall and defining a snapping hole at a free end.

3. The retention device of claim 1, wherein a bent plate perpendicularly extends from a top side of the sidewall of the first holder, the bent plate defining two fixing holes at two opposite sides thereof, the engaging portion being arranged on a center of the bent plate, two fasteners respectively extending through the fixing holes, and the snapping holes of the second portion.

4. The retention device of claim 1, wherein the second holder comprises a bottom plate, and a first and a second side plates extending upwards from two opposite peripheral sides of the bottom plate, a first and a second projections inwardly and perpendicularly extending from free end of the first and second side plates, the latch portions extending from two free end of the first and second projections.

5. The retention device of claim 4, wherein the first projection comprises two projection members arranged at two ends of the first side plate and a notch arranged between the two projection members, the projection members defining two opposite pivot holes at two opposite side surface, the handle being pivotably engaging with pivot holes of the first projection.

6. The retention device of claim 5, wherein the handle comprises an operating portion, two arms extending downward from opposite ends of the operating portion, and two pivots extending outwardly from opposite ends of the two arm, the two pivots respectively pivotably engaging with pivot holes of the first projection.

7. The retention device of claim 5, wherein the first holder comprises a bottom wall and a sidewall extending upwards from a side of the bottom wall, a bent plate outwardly extends from a top side of the sidewall, a blocking portion downwardly extends from a periphery of the bent plate.

8. A retention device, comprising:
   a first holder comprising a bottom wall and a sidewall extending upwardly from a peripheral side of the bottom wall, two locking members downwardly extending from front and rear ends of the bottom wall of the first holder, each of the locking members and the first holder defining a guideway, a blocking portion extending from a sidewall of the first holder and being parallel to the sidewall; and a second holder comprising a bottom plate and a first side plate extending upwardly from a peripheral side of the bottom plate, two projection members inwardly and perpendicularly extending from two free ends of the side plate;

wherein the second holder is arranged under the first holder via a latch portions of the second holder being received in the guideway of the first holder; or the second holder is juxtaposed with the first holder via the blocking portion being juxtaposed with the first side plate of the second holder.

9. The retention device of claim 8, wherein a bent plate perpendicularly and outwardly extends from a top side of the sidewall of the first holder, the blocking portion extending from a free end of the bent plate.

10. The retention device of claim 9, wherein a handle is pivotably engaged with the two projection members of the second holder, the handle of the second holder locking the engaging portion of first holder.

11. The retention device of claim 10, wherein a notch is arranged between the two projection members, the bent plate defining two fixing holes at two opposite ends thereof, a free end of each locking member defining a snapping hole thereof, a fastener extending through one of the fixing holes, and one of the snapping holes of the second portion to fix the first holder on the second holder.

12. The retention device of claim 11, wherein the fastener comprises a screw head and a screw rod extending from the screw head, a cap coiling around a middle of an external surface of the screw heat, a spring being arranged between the screw head and the cap.

13. The retention device of claim 12, wherein a tongue extending from an outer surface of the sidewall of the first holder, the tongue defining a slot at a free end to abut against the cap of the handle.

* * * * *